United States Patent
Rattunde et al.

[11] Patent Number: 5,298,000
[45] Date of Patent: Mar. 29, 1994

[54] INFINITELY VARIABLE CONE PULLEY TRANSMISSION

[75] Inventors: Manfred Rattunde; Gert Schonnenbeck, both of Bad Homburg, Fed. Rep. of Germany

[73] Assignee: Remiers Getriebe AG, Zug, Switzerland

[21] Appl. No.: 935,427

[22] Filed: Aug. 26, 1992

[30] Foreign Application Priority Data

Aug. 28, 1991 [DE] Fed. Rep. of Germany ....... 4128457

[51] Int. Cl.$^5$ ............................................. F16H 55/56
[52] U.S. Cl. ........................................ 474/24; 474/27; 474/28; 474/110
[58] Field of Search ............... 474/18, 24, 27, 28, 474/110

[56] References Cited

U.S. PATENT DOCUMENTS

| | | | |
|---|---|---|---|
| 4,403,975 | 9/1983 | Rattunde | 474/28 X |
| 4,439,170 | 3/1984 | Steuer | 474/28 |
| 4,557,706 | 12/1985 | Tanaka et al. | 474/28 |
| 4,716,791 | 1/1988 | Ohzono et al. | 474/28 X |
| 4,767,384 | 8/1988 | Moan | 474/28 |
| 4,798,561 | 1/1989 | Hattori et al. | 474/28 |

FOREIGN PATENT DOCUMENTS 2518496 5/1976 Fed. Rep. of Germany.
3028490 6/1982 Fed. Rep. of Germany.

Primary Examiner—Ramon S. Britts
Assistant Examiner—Roger J. Schoeppel
Attorney, Agent, or Firm—Spencer, Frank & Schneider

[57] ABSTRACT

A cone pulley transmission is disclosed which includes an infinitely actuatable and adjustable transmission wherein an axially displaceable cone pulley disc is adjustable by application of hydraulic tensioning so as to generate the pressure forces acting on a transmission belt rotating between the cone pulley discs, with the tensioning being controlled by a pressure medium through a sliding control valve. The tensioning is provided by different sized pressure chargeable surfaces and is throttled to different degrees with respect to the associated outlet of the sliding control valve. In this connection, it is provided that at least one outlet can be changed as a function of certain parameters.

6 Claims, 2 Drawing Sheets

5,298,000

INFINITELY VARIABLE CONE PULLEY TRANSMISSION

CROSS REFERENCE TO RELATED APPLICATION

This application claims the priority of Application Ser. No. P 41 28 457.7-12, filed Aug. 28, 1991, in the Federal Republic of Germany, the subject matter of which is incorporated herein by reference.

BACKGROUND OF THE INVENTION

The present invention relates to an infinitely variable cone pulley transmission including two pairs of cone pulley discs disposed on the driving shaft and on the driven shaft, respectively, and a transmission means rotating therebetween, with the cone pulley discs being connected with the shaft supporting them so as to rotate together with them. On each shaft one cone pulley disc is also axially fixed while the associated, second cone pulley disc is configured as an axially displaceable component of a cylinder-piston assembly that is fixed to the shaft. Through an inlet, each cylinder-piston assembly is provided with pressure medium that is measured out by a four-sided sliding control valve for setting and maintaining the transmission ratio of the gears. The four-sided sliding control valve is equipped with an outlet for excess pressure medium quantities in which there is disposed a possibly adjustable throttle. By way of an adjustment member, the four-sided sliding control valve is in communication, for example, with one of the displaceable cone pulley discs.

Such a so-called fully hydraulic cone pulley transmission is disclosed, for example, in German Unexamined Published Patent Application 3,028,490 which corresponds to U.S. Pat. No. 4,439,170.

In cone pulley transmissions of this type it is a known phenomenon that the required axial pressure forces are of different magnitudes at the drive shaft and at the driven shaft, respectively. The ratio of the pressure forces is thus not equal to one.

When dimensioning a cone pulley transmission, it is assumed initially that the sliding through of the transmission means is prevented on the driven side in all operating states. This results in the minimum pressure of the hydraulic system.

During operation, the transmission means then exerts a pulling force from the driven side to the driving side and this force builds up a corresponding spreading force between the cone pulley discs. This spreading force, in turn, must be supported by a hydraulically generated axial force. The axial force on the driving side is here, on the average, about 25 to 30% greater than on the driven side.

With the prior art embodiment in which the cylinder-piston assemblies are the same on the driving side and on the driven side, this higher pressure force is ensured in that the four-sided sliding control valve is displaced in such a manner that the pressure generated by the pressure medium supply is distributed accordingly to the driving side and to the driven side so that a greater pressure exists at the drive shaft than at the driven shaft.

This configuration has the drawback that the pump responsible for supplying the hydraulic cone pulley transmission with pressure medium must be able under any circumstances to furnish this higher pressure to the driving side. On the driven side, this pressure made available by the pump is throttled down to the lower pressure sufficient here.

The power requirement of the pump has a direct relationship to this pressure. This power requirement in turn is an important factor for the overall efficiency of the type of transmission discussed here which has a decisive influence on fuel consumption, particularly, for example, in connection with motor vehicle transmissions operated under partial load.

German Unexamined Published Patent Application 2,518,496 discloses, for a different type of transmission without four-sided sliding control valve, the reduction of the pressure to be furnished by the pump in that the higher axial force required on the driving side is generated in that the pressure chargeable surface of the associated cylinder-piston assembly associated with the drive shaft is larger than the surface on the driven side. Thus it is possible to operate on the driving side also with the lower pressure required on the driven side.

The drawback of the possible transfer of these unequal diameter conditions to a transmission of the above-mentioned type would be that the four-sided sliding control valve which measures the pressure medium out for the cylinder-piston assemblies would be disposed approximately in its center position. A minimum curve regarding the pressure by way of the control piston path is connected with this center position. Around this center position, the equilibrium behavior of the sliding control valve is almost indifferent. Moreover, relatively long control piston paths would be required to generate a constant transmission ratio. The equilibrium pressure could here be generated, depending on the transmission position, in the cylinder on the driving side as well as in the cylinder on the driven side since the ratio of the cylinder surfaces can only be an average with respect to the pressure conditions that change by way of the transmission ratio adjustment range of the transmission. This would cause instabilities in the control.

Another drawback of such a transmission would be that, if the diameter of the cylinder-piston assembly were increased according to the greater clamping force on one side, the set transmission ratio could be maintained only while for a change in the transmission ratio, particularly if it is to be effected quickly, a further, not insignificant counterforce would have to be generated in addition.

For these reasons such a transmission is not advisable.

SUMMARY OF THE INVENTION

It is an object of the present invention to provide a cone pulley transmission of this type in which the pressure medium supply to be provided for setting and maintaining the transmission ratio can be designed for the lower pressure required on the driven side and wherein nevertheless the associated four-sided sliding control valve does not operate in a range that is unfavorable for control purposes.

This is accomplished by the present invention on the basis of a transmission of the above-mentioned type in that the surface area of the cylinder-piston assembly charged with pressure and associated with the drive shaft is larger than the surface area of the cylinder-piston assembly charged with pressure and associated with the driven shaft; the four-sided sliding control valve is provided with a separate outlet for excess pressure medium quantities for each cylinder-piston assembly; at least one throttle is disposed in each outlet; and the throttles have different throttling effects.

The invention brings about the advantage, on the one hand, that the pump is required to produce only the lower pressure and thus its power requirement is lower.

However, the significant advantage is that the pressure on the driving side need not rise with greater throttling in the outlet but that it is necessary only to vary the pressure on the other side of the transmission in order to keep the transmission ratio constant so that the equilibrium force always acts on this other side of the transmission. In this connection it is particularly advisable to provide for greater throttling in the outlet for the driven side.

If the ratio of the pressure chargeable surface in the cylinder-piston assemblies relative to one another corresponds to the average ratio of the pressure forces over the transmission range of the transmission, as they are required in the axial direction at the pairs of cone pulley discs, it is accomplished that during subsequent adjustment or resetting of the cone pulley transmission the four-sided sliding control valve must be moved out of its basic position by only a small amount in both directions in order to effect the required pressure shifts, preferably on the driving side. Due to these small adjustment paths, the valve exhibits a relatively linear behavior in its control range.

It is necessary to make the characteristics of the four-sided sliding control valve asymmetrical, that is, to move the four-sided sliding control valve in its basic position out of the dynamically unfavorable center position, which is accomplished by the greater throttling in one of the two outlets. This can be accomplished particularly favorably from a point of view of engineering expenditures and in the sense of the object of the present invention if the outlet associated with the driven side is provided with a biasing valve in the region downstream of the four-sided sliding control valve so that this outlet is throttled more than the outlet on the driving side.

The behavior of the transmissions discussed here during changes in torque is decisive for their use, for example, in motor vehicles.

In order to approach the adjustment characteristic to requirements, the outlet on the driving side may be throttled only by means of a constant throttle while the biasing valve in the outlet on the driven side is actuated. For this type of actuation, a control is particularly advisable which is a function of the torque to be transmitted so that the cone pulley transmission is able to react particularly quickly to changes in torque as they may occur particularly if the transmission is employed in a motor vehicle.

Such an adaptation is particularly effective if both outlets are controlled or throttled, respectively, in dependence on the torque. From the point of view of engineering expenditures it is here considered to be particularly advantageous if both outlets are controlled by way of the same throttle which automatically adjusts itself in dependence on certain parameters. This throttle is disposed downstream of the biasing valve in the outlet on the driven side of the transmission.

BRIEF DESCRIPTION OF THE DRAWINGS

Further features and advantages of the invention will become evident from the description of embodiments below in connection with the attached drawing figures in which.

DETAILED DESCRIPTION OF THE PREFERRED EMBODIMENTS

Figure 1:
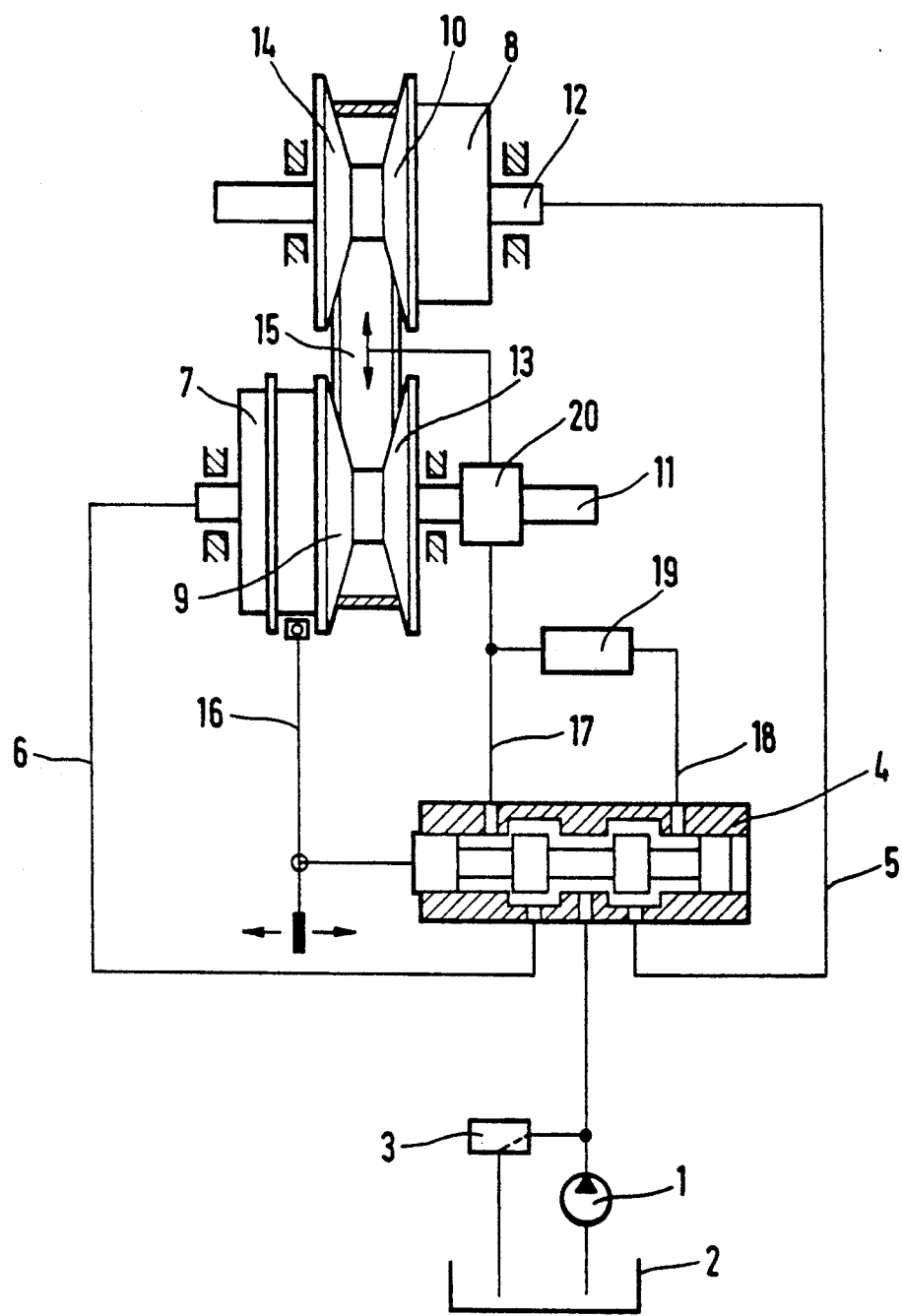
FIG. 1 is a schematic representation of the basic structure of a hydraulically adjustable cone pulley transmission according to the invention including a biasing valve in the outlet on the driven side and a parameter dependent adjustment valve for the outlets on both sides.

In a transmission according to FIG. 1, an oil pump 1 conveys pressure oil from a sump 2. Oil pump 1 is secured by way of an excess pressure valve 3.

The oil conducted by oil pump 1 is distributed by way of a four-sided sliding control valve 4 to two pressure oil conduits 5 and 6, through which it is conducted into cylinder-piston assemblies 7 and 8. The surface charged with pressure in the cylinder-piston assembly 8 associated with the driven side is smaller than the surface charged with pressure in the cylinder-piston assembly 7 associated with the driving side.

With these cylinder-piston assemblies 7 and 8, cone pulley discs are displaced along mutually parallel drive shaft 11 and driven shaft 12. Cone pulley discs 9 and 10 are then able to transfer the forces acting in the circumferential direction to these transmission shafts.

Each one of the cone pulley discs 9 and 10 is supplemented, so as to form a pair of cone pulley discs, by a cone pulley disc 13 and 14, respectively, which is fixed in the circumferential direction.

Between the two pairs of cone pulley discs, there rotates a transmission means 15 with which the torque is transferred from the drive shaft 11 to the driven shaft 12.

The position of cone pulley disc 9 which is displaceable on drive shaft 11 is sensed by an adjustment lever 16 and is fed back to four-sided sliding control valve 4. The control mechanisms taking place then are known. Regarding adjustment lever 16 in this connection, it should be pointed out that the latter is in communication in a known manner, for example, with a friction brake so that it automatically stops at the just made setting.

Oil not required by the cylinder-piston assemblies or flowing back from them flows back into sump 2 through outlets 17 and 18, which are associated with the respective control edges at the four-sided sliding control valve, that is, the control edges that are associated with the respective sides of the transmission and are not in communication with one another. On its way, the oil is also utilized to lubricate the transmission.

The outlet conduit 18 associated with the driven shaft 12 and with the cylinder piston assembly 8 disposed thereon is provided with a biasing valve (throttle) 19 which throttles this conduit more compared to outlet conduit 17 which is associated with drive shaft 11 and with cylinder piston assembly 7 seated thereon. Both outlets 17 and 18 are then additionally throttled by an automatic, parameter dependent adjustment valve (throttle) 20, for example, by means of a known torque sensor.

Thus, the parameters relevant for the adjustment may be the torque to be transmitted as well as the transmission ratio, the number of driving revolutions, the temperature of the oil and the like.

It is known that the axial pressure forces are greater at the pair of cone pulley discs on drive shaft 11 than the axial forces that act on the pair of cone pulley discs on driven shaft 12.

In the cone pulley transmissions according to the present invention, these different requirements for axial forces are effected by piston faces on the cylinder-piston assemblies 7 and 8 which have been adapted in size. The placement of a biasing valve 19 according to the invention in outlet 18 has the consequence that the eccentric position of the four-sided sliding control valve causes its control dependent change in position to have a greater influence on the cylinder-piston assembly on the driving side than on the cylinder-piston assembly on the driven side, with the pressures in cylinder-piston assemblies 7 and 8 being approximately the same so that the ratio of the pressure forces corresponds to the ratio of the surfaces (according to: force = pressure × surface area). The advantages resulting therefrom have already been described above.

Figure 2:
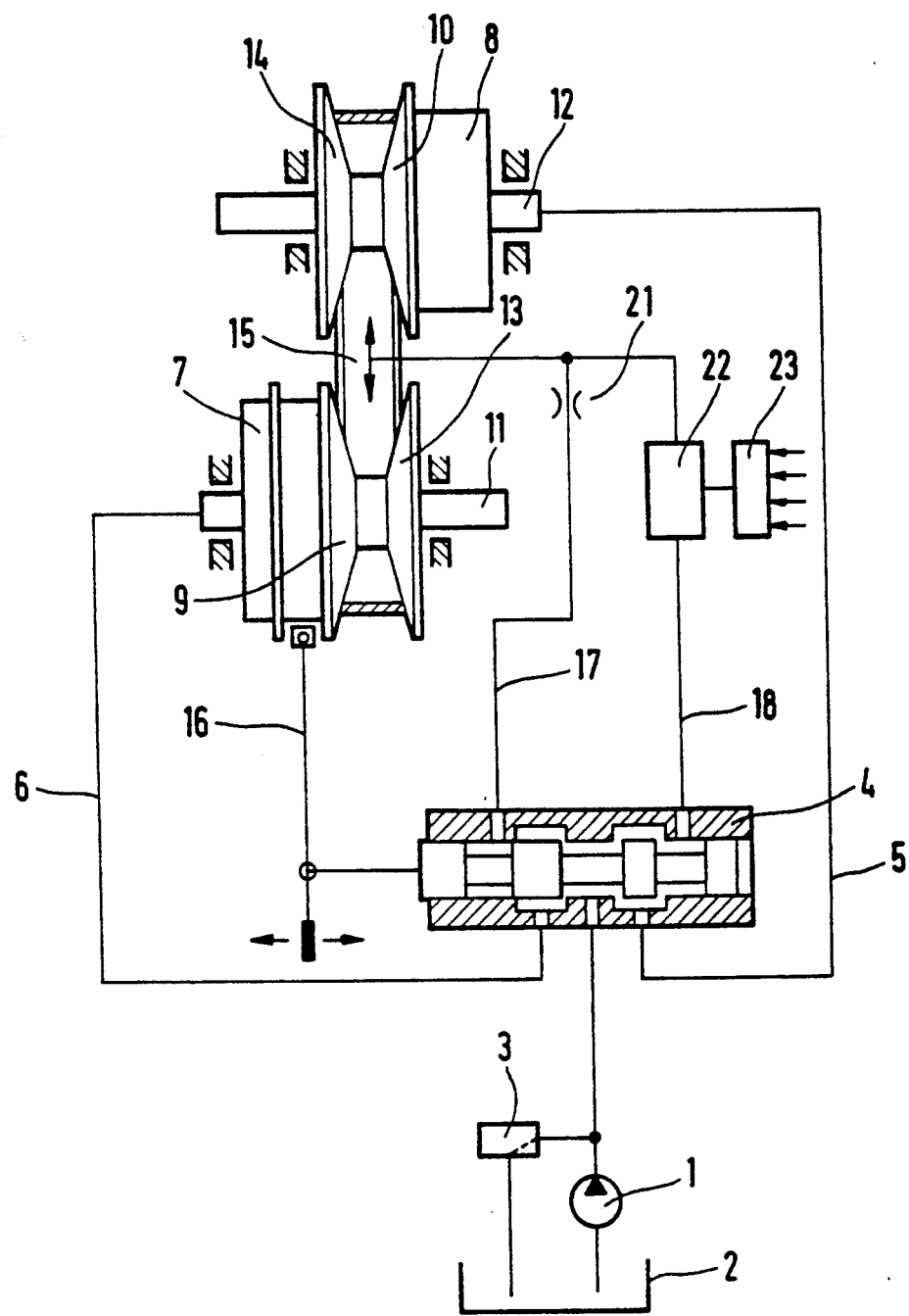
FIG. 2 is a schematic representation of the basic structure of a hydraulically adjustable cone pulley transmission including an actuated valve in the outlet on the driven side and a constant throttle in the outlet on the driving side.

The same is accomplished with the arrangement according to FIG. 2. This arrangement corresponds in its significant components to the arrangement according to FIG. 1 so that the same parts are given the same reference numerals.

In contrast to the already described arrangement, in the arrangement according to FIG. 2, outlet 17 of the cylinder-piston assembly 7 associated with the driving side is throttled by way of constant throttle 21 while the outlet 18 on the driven side is throttled by a controlled biasing valve (throttle) 22. This actuation is effected, for example, by a microprocessor 23 which calculates the corresponding control values from actual values for torque, number of revolutions, transmission ratio, oil temperature and the like. With this multitude of parameters to be considered, the transmission is able to adapt itself particularly finely to its operating conditions.

Another advantage of the drives described here is that without an additional standstill valve, it is possible to effect a standstill adjustment as it is necessary, for example, in a motor vehicle transmission after a quick stop so as to cause the transmission, when standing still, to start again in a low gear.

It will be understood that the above description of the present invention is susceptible to various modifications, changes and adaptations, and the same are intended to be comprehended within the meaning and range of equivalents of the appended claims.

What is claimed is:

1. In an infinitely variable cone pulley transmission including two pairs of cone pulley discs (9, 13 and 10, 14) that are disposed on the drive shaft (11) and on the driven shaft (12) and a transmission means (15) that rotates therebetween, with the cone pulley discs being connected to rotate together with the shaft supporting them and one cone pulley disc is also axially fixed on each shaft, while the associated second cone pulley disc is configured as an axially displaceable component of a cylinder-piston assembly (7, 8) that is fixed to the shaft, with the cylinder-piston assembly receiving a pressure medium for setting and maintaining the transmission ratio that is measured out by way of an inlet (5, 6) through a four-sided sliding control valve (4) which is provided with an outlet (17) for excess quantities of pressure medium, in which a possibly adjustable throttle (20) is disposed and wherein the four-sided sliding control valve is in communication by way of an adjustment member (16), for example, with one of the displaceable cone pulley discs (9), the improvement wherein the pressure chargeable surface of the cylinder-piston assembly associated with the drive shaft is greater than the pressure chargeable surface of the cylinder-piston assembly associated with the driven shaft; the four-sided sliding control valve is provided with a separate outlet (17, 18) for excess quantities of pressure medium for each cylinder-piston assembly; at least one throttle (19, 20) is disposed in each outlet (18, 17) and the throttles (19, 20) perform a different throttling effect.

2. A transmission according to claim 1, wherein the ratio of the surfaces to one another corresponds to the average ratio of the pressure forces that are required in the axial direction at the pairs of cone pulley discs (9, 13 and 10, 14) over the transmission range of the transmission.

3. A transmission according to claim 1, wherein the outlet (18) of the cylinder-piston assembly (8) associated with the driven shaft (12) includes a biasing valve (19 or 22) so as to effect additional throttling of this outlet (18).

4. A transmission according to claim 3, wherein the outlet (17) of the cylinder-piston assembly (7) associated with the drive shaft (11) includes a throttle (21) which has a constant throttling effect and the throttling effect of the biasing valve (22) is controllable.

5. A transmission according to claim 3, wherein both outlets (17, 18) are conducted through one and the same throttle (20) downstream of the biasing valve (19), with the throttle (20) being automatically adjusted in dependence on parameters.

6. An infinitely variable cone pulley transmission, comprising
   (a) a drive shaft (11);
   (b) a pair of first (9) and second (13) drive cone pulley discs mounted on said drive shaft; said first drive cone pulley disc being axially displaceable on and relative to said drive shaft and said second drive cone pulley disc being affixed to said drive shaft;
   (c) a first cylinder-piston assembly (7) coupled to said first drive cone pulley disc for axially displacing said first drive cone pulley disc on said drive shaft; said first cylinder-piston assembly having a pressure-chargeable surface;
   (d) a driven shaft (12);
   (e) a pair of first (10) and second (14) driven cone pulley discs mounted on said driven shaft; said first driven cone pulley disc being axially displaceable on and relative to said driven shaft and said second driven cone pulley disc being affixed to said driven shaft;
   (f) a second cylinder-piston assembly (8) coupled to said first driven cone pulley disc for axially displacing said first driven cone pulley disc on said driven shaft; said second cylinder-piston assembly having a pressure chargeable surface smaller than said pressure-chargeable surface of said first cylinder-piston assembly;
   (g) a transmission member (15) trained about and circulating between said pairs of cone pulley discs;
   (h) hydraulic means (1-6) for applying a pressure medium to said first and second cylinder-piston assemblies to set and maintain a desired transmission ratio between said pairs of cone pulley discs; said hydraulic means including
      (1) a four-sided sliding control valve (4);

(2) a first inlet (6) connecting the control valve with said first cylinder-piston assembly for applying pressurized medium thereto; and (3) a second inlet (5) connecting the control valve with said second cylinder-piston assembly for applying pressurized medium thereto;

(i) a first outlet (17) extending from said control valve for relieving excess quantities of pressure medium for said first cylinder-piston assembly;

(j) a first throttle (20 or 21) disposed in said first outlet for throttling the flow of pressure medium therein;

(k) a second outlet (18) extending from said control valve for relieving excess quantities of pressure medium for said second cylinder-piston assembly; and (l) a second throttle (19 or 22) disposed in said second outlet for throttling the flow of pressure medium therein; said first and second throttles having different throttling effects.

* * * * *

UNITED STATES PATENT AND TRADEMARK OFFICE
CERTIFICATE OF CORRECTION

PATENT NO. : 5,298,000
DATED : March 29, 1994
INVENTOR(S) : Manfred Rattunde et al It is certified that error appears in the above-indentified patent and that said Letters Patent is hereby corrected as shown below:

On the title page, in item [73], the assignee's name should read --Reimers Getriebe AG--.

Signed and Sealed this

Sixteenth Day of August, 1994

Attest:

BRUCE LEHMAN

Attesting Officer

Commissioner of Patents and Trademarks